Patented May 19, 1942

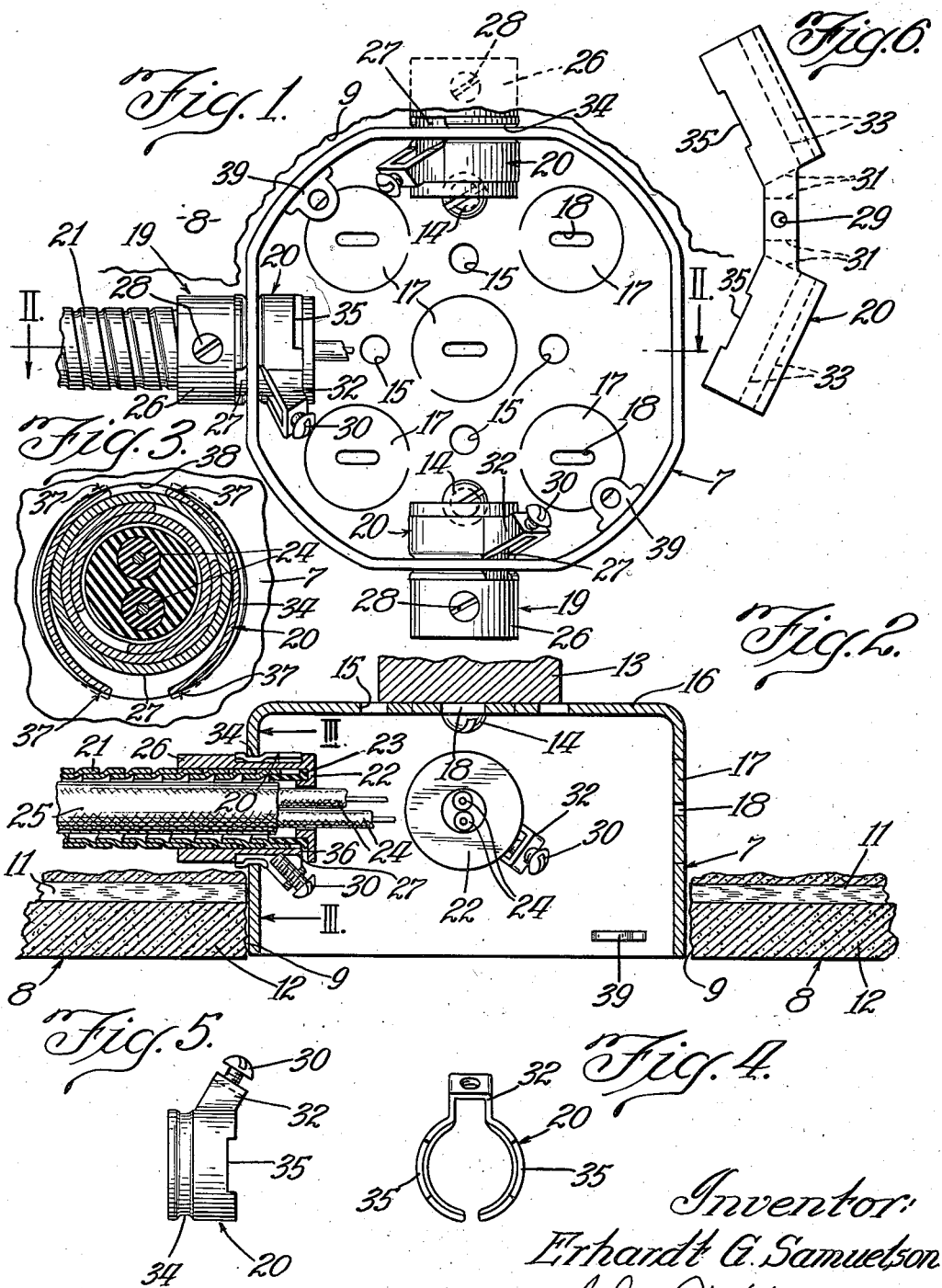

2,283,649

UNITED STATES PATENT OFFICE 2,283,649

CABLE CONNECTOR

Erhardt G. Samuelson, Chicago, Ill., assignor of one-half to Carl O. Holmes, Chicago, Ill.

Application January 31, 1940, Serial No. 316,604

5 Claims. (Cl. 285—47.2)

This invention pertains to connectors for electric cables and the like and, more particularly, to connectors or fittings for anchoring or securing cable ends to outlet, junction, fuse and switch boxes and the like. The invention is primarily designed for use in anchoring armored cable to devices or fixtures such as the boxes mentioned where such devices, for instance, outlet boxes, have already been installed and for some substantial reason the cable cannot be secured or anchored to the box by the ordinary connectors such as those of the type disclosed in Selig Patent 2,120,993 of June 21, 1938.

Where an outlet box or the like is so disposed as to permit easy access from the exterior for the insertion of a cable end and a fitting or connector attached thereto through an opening in the bottom or a side wall of the box, it is a relatively easy matter to make a connection and to anchor the cable and fitting, using a fitting (cable connector) of the ordinary type such as one of those disclosed in the above noted patent. Cable connectors of the type of said patent are so constructed that they can be inserted into the box openings only from the exterior of the box. Accordingly, if the box is disposed in a recess where there is not finger room for work from the exterior of the box or if the cable connector cannot be applied over the end of the cable and inserted through the box opening from the exterior because of lack of space or inaccessibility, or if the box is disposed in an opening in a wall and it is not desirable or practical to tear out sufficient of the wall to permit access to the box exterior to effect the necessary connection, cable connectors or fittings of the above mentioned patented type cannot be used. This is mainly for the reason that the usual cable connector fittings, by virtue of their construction, must be applied and secured to the cable end before the cable end and the cable conductors are passed from the outside to the inside of the box and the application must be made at a place exterior of the box. After the connector is anchored to the cable and the conductors together with the cable end are passed through the appropriate opening in a box wall, the forward end of the connector protrudes through the opening to the interior of the box and is there secured by a threaded clamp ring or other suitable means. Cable connections of this kind are easily and quickly made so long as the cable end and the box are readily accessible from the box exterior, but if the box is already so disposed, as in a wall which would require partial destruction to provide accessibility, as to make it impractical or impossible to obtain access to the cable and the exterior of the box for effecting proper anchorage of the connection as above described, the cable must be left unanchored to the box or resort must be had to some make-shift arrangement to effect anchorage. Where the cable end is not firmly and properly secured to the box and, perhaps, also electrically grounded to the box, potentially dangerous conditions may exist.

The primary or principal object of the invention therefore, is to provide a connector or fitting adapted to be applied or anchored to a cable or the like from the interior of an outlet or other connection box or the like and also adapted to be applied and firmly, properly and safely secured or fastened to the box, mechanically and electrically, solely by access from the interior of the box and regardless of whether or not the box and cable are accessible from the box exterior. In other words, the main objective of the invention is to provide an effective and safe means whereby cable carrying electric conductors may be connected with and firmly anchored to a fixture, such as an outlet box, without the necessity of placing the connector over the cable end before the cable end or conductors are disposed through the usual opening in the fixture, and without being obliged to insert the fitting connector and cable end attached thereto through the fixture opening from the box exterior.

Another important object is to provide a connector of the character mentioned so constructed and arranged that it may be manufactured at relatively little cost and may be applied to its uses in a simple and expeditious manner. In this connection it may be mentioned that the connector is adapted to be applied to various types of cable including armored cable and electric conduit.

Further objects as well as the uses and advantages of the invention will be or should become apparent and understood after reading the following description and claims and after viewing the drawing in which:

Fig. 1 is a plan view of the front of an electric outlet connection or junction box from which the cover or top has been omitted but with which is shown a portion of a wall within an opening in which the box is disposed.

Fig. 2 is a sectional view taken substantially along the lines II—II of Fig. 1, also illustrating a portion of a wall within which the box is disposed and the proximity with which the margins defining the wall opening may reside with respect to the box walls.

Fig. 3 is a sectional view on the line III—III of Fig. 2.

Figs. 4 and 5, respectively, are top plan and side elevation views of an expansion ring or split collar used in the form of the invention herein illustrated, and, Fig. 6 is a plan or developed view of the split collar of Figs. 4 and 5 as it appears when stamped or cut from sheet metal and before being formed into final shape.

Wherever in the description and claims the term "outlet box" is used, it should be understood as being of broad significance and meaning and as including any fixture or device to which a cable or conductor is to be secured, regardless of the particular character or specialized purpose of the fixture itself, always assuming that the invention has functional utility or adaptability for use in connection therewith. Similarly, the terms "connector" and "fitting" are used more or less interchangeably and are intended to be synonomous. Likewise, "cable" and "conductor" are to be understood as referring to any device or thing, including electric cables whether armored or not, conductors and conduits, which is to be fastened or anchored to a box enclosure comparable in structure or use to an outlet box, again assuming that the invention, in one form or another, is applicable thereto.

The invention has been illustrated in but a single form and as applied to an outlet or junction box 7 disposed within an opening in a wall 8 the margin of the wall defining the opening being designated 9. As illustrated in Fig. 2, the wall 8 may include lath 11 and plaster 12 supported on suitable studding or joists or other structural elements as the case may be. A stud or other structural element 13 supports the box 7 which is secured thereto in any suitable manner as by screws 14 which pass through preformed openings such as openings 15 in the bottom or back wall 16 of the box 7. The back and side walls of the box are provided with what are commonly termed "knock outs" which when removed as by inserting the tip of a screw driver in slots 18, leave openings through the box walls through which cables and conductors may pass and within which the cable connectors are disposed for securing or anchoring the cables etc. to the box itself.

The form of the invention illustrated comprises a hollow cylindrical sleeve or bushing 19 which forms the body of the fitting or connector and is fastened to the cable, and a split collar or expansible sleeve 20 which surrounds and is carried by the body or sleeve 19 and serves to lock the fitting and box together. The interior diameter of the body 19 is such as slidably but snugly to receive the end of an armored cable 21, the end of the armor being adapted either to abut an inwardly projecting circumferential shoulder 22 integral with the inner end of the fitting body or to telescope over at least a portion of a cylindrical fiber (electrically non-conducting) bushing 23 disposed within the fitting body and within a recess formed in the inner side and extending circumferentially of the shoulder 22. The circumferential shoulder 22 defines an opening through which the insulated conductors 24 project interiorly of the box from the cable end, the conductors having secondary insulation 25 disposed about them and between them and the interior surface of the armor. If desired the shoulder 22 or the bushing 23 or both, may be omitted and the shoulder may be interrupted as will be understood.

The body 19, which may be formed as a casting or as a screw machine product or otherwise, has a maximum external diameter which is preferably slightly less than one of the "knock out" openings in the box or fixture so that its end 26 may be disposed (passed) through the opening. The body 19 is provided with a circumferentially extending channel or groove 27 within which the expansible collar or sleeve 20 is adapted to be received and, preferably, in such manner that the sleeve may be rotated about the body. A set screw 28 is threaded into a tapped hole in the body end 26 and engages the armor 21 to secure the cable in its telescoped position within the body.

Referring now to Figs. 4, 5 and 6, in which the split collar or expansible sleeve is illustrated in detail, it will be noted that this part of the fitting easily may be made by stamping the same from a metal sheet, the stamped blank of the instant form, appearing substantially as illustrated in Fig. 6. In Fig. 6 the full lines indicate the marginal edges of the blank and include a circular hole 29 which is later tapped for the reception of a set screw 30 the purpose of which will later appear. In Fig. 6 the dotted lines 31 indicate the lines of bending of the blank to form an angularly disposed boss 32 while the dotted lines 33 indicate lines of bending to form a channel or groove 34, the width of which, preferably, is slightly greater than the thickness of the wall of the outlet box at the "knock out" opening. After the blank of Fig. 6 has been tapped and formed to its proper shape it appears as indicated in Figs. 4 and 5. The The edge of the blank remote or opposite to the edge adjacent to the groove 34 is cut away as indicated at 35 to provide sight openings adapted to register in part at least with some part of similar slots 36 formed in the body member adjacent to the shoulder 22, so as to permit inspection of the interior of the fitting at its inner end. These slots may be omitted if the shoulder 22 is of the interrupted type and permits the necessary inspection of the interior. In assembling the body 19 and the split collar 20, the collar may be sprung sufficiently to permit it to be slipped over one end of the body and into the groove or channel 27 with the channeled or grooved edge of the collar disposed adjacent to the end 26 of the body. In this assembled relation the greatest outside diameter of the split collar is substantially equal to the outside diameter of the body at its greatest transverse dimensions so that that end of the split collar which is adjacent to the end 26 of the body, may, like the body, be slipped freely through the "knock out" opening in the fixture or box.

Where an outlet box or other similar fixture is so situated as to prevent access from the exterior for the insertion and anchoring of a cable end, it is not a difficult matter to "fish" the cable through the wall and to bring its end into the fixture or box through one of the "knock out" openings provided therein. The end of the cable is then pulled into the box sufficiently to permit one of the fittings above described to be slipped over the end thereof. After the fitting is telescoped over the end of the cable the set screw 28 is tightened down against the armor of the cable and the cable is pushed back through the opening through which it passes until the groove or channel 34 in the split collar registers with the edge of the box defining the "knock out" opening whereupon the boss 32 carrying the set screw 30 may be rotated around to an accessible position and the screw 30 tightened.

The screw 30, reacting against a portion of the bottom of the channel or groove 27 in the body, urges the body and split collar in diametrically opposed directions with the result that the split collar is forced into an eliptical shape as indicated in Fig. 3. This distortion of the split collar brings the bottom of channel 34 into engagement at several places 37 with the marginal edge 38 of the fixture wall defining the "knock out" opening and thereby securely anchors the cable end to the fixture. The shoulders or sides of the channel 34 prevent axial or longitudinal movement of the fitting relative to the box. If the resilience of the metal of which the split collar is made is sufficient, and it need not be great, the fitting may be easily removed by releasing the set screw 30 and permitting the body and split collar to resume their original relative concentric positions. It will be understood, of course, that the split collar and the body will be relatively adjusted with respect to one another, the armored cable and the fixture, so as to dispose the sight openings in the body and collar in register and the set screw and boss 32 in satisfactorily accessible positions. After the desired electrical connections have been made, the box cover (not shown) will be put in place over the fixture and secured thereto by screws which fasten into lugs 39 secured in the side walls of the fixture.

While I have illustrated and described a preferred form of the invention, its manner of use and certain of the advantages flowing therefrom, it is to be understood that the invention is susceptible of other embodiments and forms bearing little if any structural resemblance to the form illustrated although embodying the same principles, and that the invention may be used in other ways and for other purposes with the same or other advantageous results. Consequently, I do not wish to be limited except by the spirit of the invention and the scope of the appended claims.

I claim:

1. A connector for anchoring a cable to a fixture comprising, a one-piece tubular body, means defining opposed and spaced shoulders extending substantially circumferentially of the exterior of said body intermediate of the ends thereof, one of said shoulders being adapted to pass through a cable receiving aperture in the fixture, means for securing a cable within said body, means carried by said body between said opposed shoulders and movable circumferentially thereabout and also relative to said body in a direction transverse to the axis thereof for engaging the marginal edge defining a cable receiving aperture in a fixture, and means carried by said connector for effecting said relative movement between said body and means carried thereby.

2. A connector for anchoring a cable to a fixture comprising, a sleeve-like body adapted at one end to telescope over a cable end and also adapted at said end to pass through an aperture in a fixture wall, means carried by said body for clamping the same to a cable, said body having a circumferentially extending groove intermediate of its ends, an expansible collar carried by said body within said groove and rotatable therein about the body for clamping the body relatively rigidly to the fixture wall, and means for expanding a part of said collar out of said groove toward and into engagement with said fixture wall at the perimeter of said aperture.

3. A connector for anchoring a cable to a fixture comprising, a sleeve-like body adapted at one end to telescope over a cable end and also adapted at said end to pass through an aperture in a fixture wall, means carried by said body for clamping the same to a cable, said body having an external circumferentially extending groove intermediate of its ends and providing opposed spaced shoulders, a split collar carried by said body within said groove and retained between said opposed shoulders and expansible outwardly of said groove upon relative transverse movement of said collar and body in one direction, said collar being rotatable about and relative to said body and having exterior circumferentially extending and opposed shoulders adapted to engage opposite sides of said fixture wall about said aperture upon expansion of said collar, and means for moving said collar and body relatively in said one transverse direction.

4. In combination with a fixture of the character described such as an electric outlet-box, said box having a cable opening in a wall thereof and said opening being accessible only from the interior of the box for the attachment of a cable connector to a cable end projected through said opening and for anchorage of said connector and the cable end attached thereto to the fixture wall margins about said opening, and in combination with a cable projecting through said opening, of a connector comprising a substantially circumferentially continuous sleeve-like body the transverse dimensions of one end portion of which are less than the corresponding dimensions of said opening, said body end portion being disposed in telescoping relation over said cable end and secured thereto and projecting through said opening to the exterior of said box, means structurally independent of and carried on said body and releasably interlocking said body and the opposite sides of said wall about said opening, and means accessible only from the interior of said box for effecting the locking and release of said interlocking means.

5. A connector for anchoring a cable to a fixture such as an outlet box comprising, a sleeve-like body adapted at one end portion to telescope over a cable end and of such dimensions at said end portion as to pass through an aperture in the fixture wall, said body end portion having a groove extending substantially circumferentially thereof defining spaced shoulders, an expansible split collar disposed about said end portion within said groove and retained between said spaced shoulders, said collar being expansible in a direction transverse to the axis of said body and having an end portion normally adapted to pass through said fixture aperture when assembled on said body, said collar having a groove defining spaced shoulders adapted to engage opposite sides of the fixture wall about said aperture upon expansion of the collar, and means for moving the collar and body relative to one another in a transverse direction to effect expansion of said collar.

ERHARDT G. SAMUELSON.